May 17, 1927.

R. V. MORSE 1,629,084

ELECTROMAGNETIC BRAKE

Filed Aug. 7, 1924

2 Sheets-Sheet 1

INVENTOR

Robert V. Morse

Patented May 17, 1927.

1,629,084

UNITED STATES PATENT OFFICE.

ROBERT V. MORSE, OF ITHACA, NEW YORK.

ELECTROMAGNETIC BRAKE.

Application filed August 7, 1924. Serial No. 730,727.

This invention relates to brakes, and has for its purpose the substitution of electromagnetic drag for frictional drag, particularly when operating at high speeds, while at the same time permitting frictional braking when necessary. Another object as applied to vehicles is to provide a brake which will automatically tend to release when a wheel ceases to rotate, so as to reduce the danger of skidding. Other objects, relating to ease of application, simplicity of construction, and permanence of adjustment will become apparent as the description proceeds.

Figure 1:
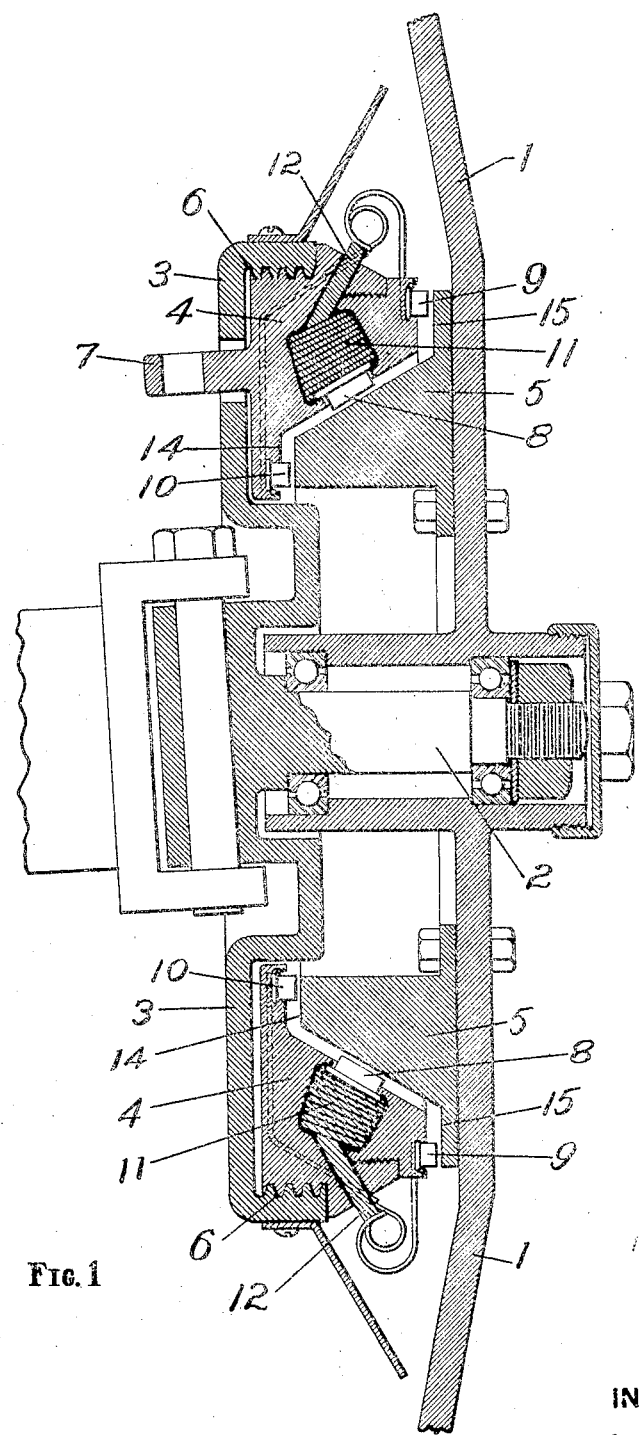
Figure 2:
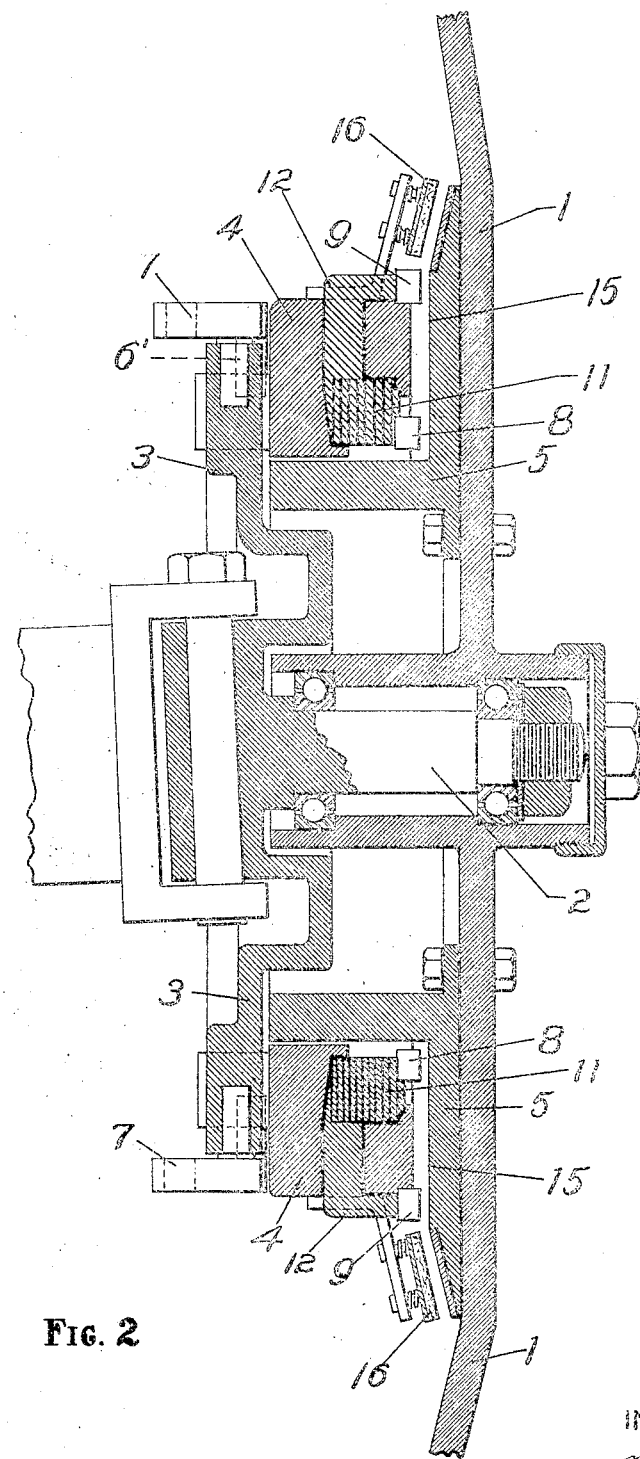

Referring now to the drawing, Fig. 1 is a cross-section showing by way of illustration a form of the brake as applied to the wheel of a vehicle; Fig. 2 shows a modification.

In the example shown in Fig. 1, the wheel 1 is mounted to rotate on the axle 2. The frame 3 is fixed to the axle 2 so as not to rotate thereon, and carries the magnetic field structure 4. The armature 5 is bolted to the wheel disk 1, and the action of the brake is to impose a drag or counter-torque on the rotation of the wheel 1, as will be described. The field structure 4 may be moved axially by any suitable means, such as a lever, cam, wedge, or screw; in the example shown in Fig. 1 the frame 3 and field structure 4 are provided with screw threads 6, so that when the field structure 4 is turned by means of the arm 7 it will be moved axially. When the field structure 4 is thus moved to the right in the drawing, the brushes 8, 9, and 10 are brought in contact with the armature 5. This completes an electric circuit which may be described as beginning at the brushes 8, thence outward thru the field coil 11 to the terminals 12, at which the current divides, part of it going to the brushes 9 and part to the brushes 10. From the brushes 9 and 10 the circuit passes thru the armature 5 back to the point of begining at the brushes 8. The field coil 11 is preferably annular in shape, extending around the armature, and may either be composed of complete coils, or may be built up of inclined leads between the brushes 8 and terminals 12, each lead extending a fraction of a turn, which serves the same purpose. This annular type of excitation creates a pair of homopolar fields, each of constant polarity entirely around the armature, one of the homopolar fields lying between the brushes 8 and the brushes 9, and the other lying between the brushes 8 and the brushes 10. These two homopolar fields are of opposite polarity, so that when the armature 5 is rotated the generated currents will flow in opposite directions across them, as for example from the brushes 9 and 10 inward to the brushes 8. In accordance with the laws of electricity the direction of current flow is such as to oppose the rotation of the armature 5, and thus it exerts a braking effect on the wheel 1. A low resistance in the circuit which has been described facilitates a heavy flow of current. The current flow and braking effect can be varied at any given speed by varying the field strength, which can be done in a self contained unit such as described by varying the air gap, as by making the air gap radial or at least tapered, so that as the field structure 4 is moved axially, to the right in the drawing the air gap is reduced and the braking effect increased. This also has a beneficial servo-effect, as the magnetism tends to draw the field structure 4 into contact with the armature 5, making the brakes easy in application by offsetting the resistance of the usual brake pedal spring.

Further application of the brake, by moving the field structure 4 still further to the right, brings about actual frictional contact, either at the point 14 or 15. This gives a very powerful braking effect, particularly as it is reinforced by magnetic action, and is chiefly useful for coming to a dead stop, whereas the electro-dynamic braking previously described is most useful in regulating the rolling speed. Instead of using the field structure 4 itself as a brake shoe, as has been described, any suitable form of separate brake shoe may be attached thereto if desired, and any suitable brake lining may be employed, as at 16 in Fig. 2.

The modification shown in Fig. 2 while in general similar in principle to Fig. 1 as previously described, employs but one armature circuit between the brushes 8 and 9 instead of two circuits between brush 8 and 9 and the brush 8 and brush 10 as used in Fig. 1. Also in place of the screw thread 6 a mechanical equivalent cam or cam surface 6' is illustrated.

The electrical action operates in the following manner to reduce the danger of skidding. It will be understood that the ordinary friction type of automobile brakes are usually equalized so far as the pressure on the brake bands is concerned, but if the brakes are applied and one of the tires happens to strike a slippery piece of road where the friction between the tire and the road is less than the friction at the brake band, the wheel will promptly cease to rotate and begin to skid. Thus it will be apparent that merely equalizing the brake pressure is insufficient. So long as pressure is applied on the rest of the brakes the slippery wheel will remain locked and skidding will continue. In the electrical type of brake which has been described the braking action is normally not merely a function of pedal pressure but also of the rotative speed of the wheel, since the rotation of the wheel generates the electric currents which bring the magnetic braking effect into action. If then one of the wheels strikes a slippery spot and stops rotating the electric current ceases and the magnetic braking is released on that wheel without affecting the full braking action on the other wheels. Thus the braking force is in effect equalized at the road instead of at the brake bands, insuring the fullest control of the car and reducing the danger of skidding.

In cases where the field structure 4 is moved axially by a screw 6 or equivalent means, and the friction of the brake shoe surfaces has a tendency to wind up the brake so as to lock it, the pitch of the screw 6 or equivalent means may be given the opposite direction, so that when the car is travelling forward the frictional tendency is to unlock the brake. This will prevent the brake from locking at high speeds. In cases where the controlling linkage is arranged to give the field structure a straight axial motion this difficulty does not arise.

In the foregoing specification we have taken one of the most simple forms of electric generator and one of the most simple forms of frictional brakes, but it will be understood of course that the invention is not limited to the particular form illustrated. Bi-polar or multipolar electric generators may be employed in place of the homopolar type; the field structure may be either inside or outside the armature, or the air gap may be merely radial; and the friction surfaces are capable of manifold variation, as will be apparent to those skilled in the art. The particular arrangement shown is given merely by way of illustration, and the essential features and combinations which constitute the invention are embodied in the following claims:

1. In a brake, the combination of a rotating member to be braked, a friction brake adapted to operate on said member, mechanical means for applying said friction brake, magnetic means for augmenting the force of said mechanical means when the brake is applied, said magnetic means being energized by the rotation of the member to be braked.

2. In a brake, the combination of a rotating member to be braked, a dynamo-electric machine having brushes arranged so that when the brake is not acting the circuit of the dynamo-electric machine is broken at the brushes, and a brake applying means arranged to close the circuit of said dynamo-electric machine so that it will operate as an electro-dynamic brake, further application of said brake applying means serving to diminish the air gap of the magnetic circuit of the dynamo-electric machine so as to increase the braking effect.

3. In a brake, the combination of a rotating member to be braked, a dynamo-electric machine arranged to operate as an electro-dynamic brake, and means for varying the air gap of said dynamo-electric machine by an axial movement relative to said rotating member so as to increase the magnetic flux in the dynamo-electric machine as the brake is applied.

4. In a brake, the combination of an electro-dynamic machine comprising a field structure, an armature, a circuit arranged so that said machine may operate as an electro-dynamic brake, a brake applying means arranged so as to first close said circuit and on further application to bring a surface fixed relative to the field structure into contact with a surface fixed relative to the armature so as to create an additional frictional braking effect.

5. In a brake, the combination of an electro-dynamic machine comprising a field structure, an armature, a circuit arranged so that said machine may operate as an electro-dynamic brake, and a brake applying means arranged so as to first close said circuit, then on further application diminish the air gap of the magnetic circuit of the electro-dynamic machine so as to increase the braking effect and finally to bring a surface fixed relative to the field structure into contact with a surface fixed relative to the armature so as to create an additional frictional braking effect.

6. In a brake, the combination of a homopolar field structure, an armature, brushes normally out of contact with the armature when the brake is not applied, a series field circuit between the brushes, and a brake applying means arranged to produce an axial movement between the field structure and the armature so as to first bring the brushes into contact with the armature, then diminish the air gap between the field structure and the armature as the brake is further applied, and finally to bring about a frictional contact between a surface fixed relative to the field structure and a surface fixed relative to the armature, the frictional braking effect being augmented by the magnetic attraction between the field structure and the armature.

7. In a brake, the combination of a field structure, an armature, the air gap between the field structure and armature having a sufficiently inclined or radial portion so that the reluctance of the airgap may be varied by axial motion between the field structure and armature, spring brushes recessed relative to the field structure so that they will not be injured in case the field structure comes in contact with the armature, said brushes being normally out of contact with the armature when the brake is not applied, a series field circuit between the brushes, and a brake applying means arranged to first bring the brushes into contact with the armature, then diminish the air gap between the field structure and the armature as the brake is further applied, and finally to bring about a frictional contact between a surface on the field structure and a surface on the armature, the frictional braking effect being augmented by the magnetic attraction between the field structure and the armature.

8. In a brake, the combination of a homopolar field structure, an armature of magnetic material which material serves both to transmit the magnetic flux and the armature currents, brushes normally out of contact with the armature when the brake is not in action, means for bringing the brushes into contact with the armature when the brake is applied and for progressively increasing the magnetic flux as the brake is further applied, a friction braking means arranged to be brought into action when the brake is applied to its full extent.

In witness whereof I have hereunto set my hand this 31st day of July, 1924.

ROBERT V. MORSE.